March 15, 1960 W. G. WEBSTER 2,928,412
EIGHT PORT DISTRIBUTOR VALVE
Filed Oct. 22, 1956

INVENTOR.
WILLIAM G. WEBSTER
BY John N. Wolfram
ATTORNEY

United States Patent Office 2,928,412
Patented Mar. 15, 1960

2,928,412

EIGHT PORT DISTRIBUTOR VALVE

William G. Webster, Lyndhurst, Ohio, assignor to Parker-Hannifin Corporation, Cleveland, Ohio, a corporation of Ohio Application October 22, 1956, Serial No. 617,314

4 Claims. (Cl. 137—238)

This invention relates to fluid metering valves and more particularly to a construction wherein a high degree of accuracy is obtained in the relative quantities of fluid metered to a multiple of valve ports.

The present invention has particular application in the fuel control system of jet engines wherein it is important to feed equal amounts of fuel to a plurality of burners in the engine and wherein the fuel must be carefully regulated so that flow to each burner starts simultaneously and is kept equal at various flow rates.

Distribution of fuel to jet engine burners is sometimes accomplished with distributing valves having a sleeve with a plurality of radially spaced slots or holes which are uncovered by a valve plunger slidable within the sleeve. Heretofore, it has been very difficult to form the slots or holes with enough accuracy to assure simultaneous uncovering of the same by the valve plunger and the maintenance of equal flow openings at various positions of the valve plunger.

It is an object of the present invention to provide a valve construction which is relatively easy to manufacture yet provides a very high degree of accuracy in the control of fluid distribution to a multiple of outlets.

Another object is to provide a means for preventing foreign particles in the fluid from causing the movable valve member to stick, wherein such means comprises directing finely filtered fluid to the slide fit of the valve member and directing the filtered fluid which seeps through the fit into the valve outlets in substantially equal amounts.

Figure 1:
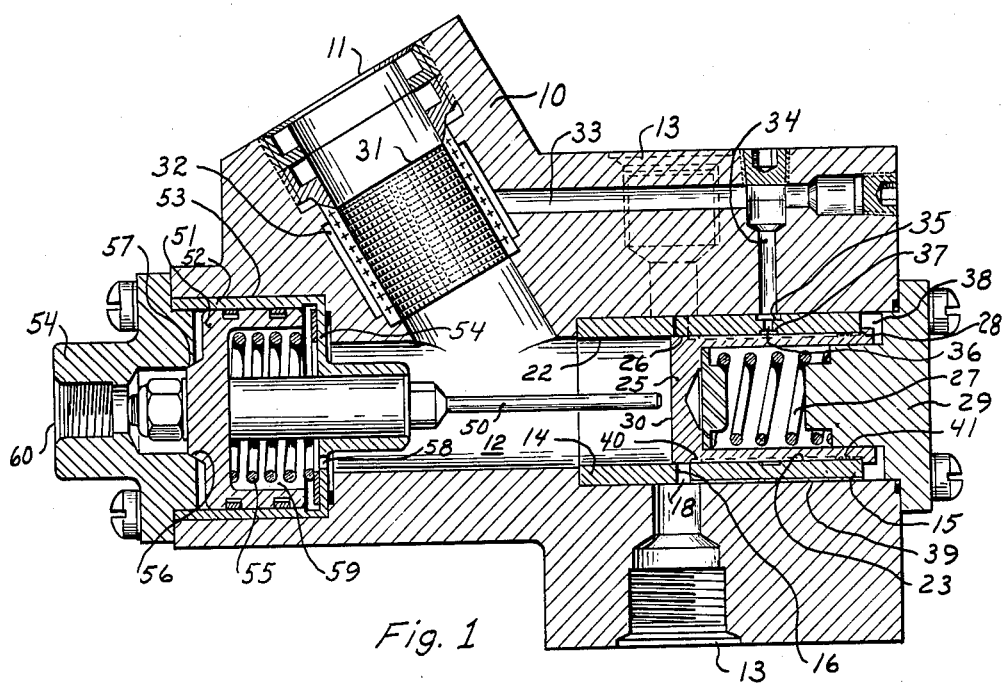
Figure 2:
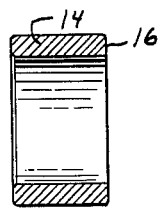
Figure 3:
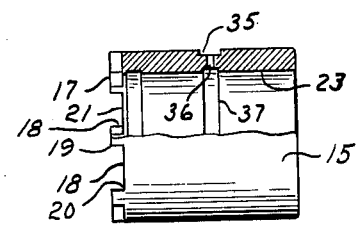
Figure 4:
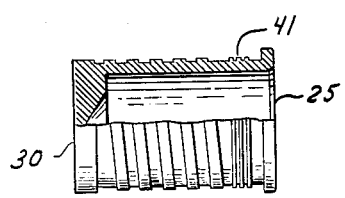

Other objects of the invention will be apparent from a detailed description of the device and from the drawings, in which:

Figure 1 is a cross-section view of the valve assembly,
Figure 2 is a cross-section view of a first sleeve part,
Figure 3 is a one quarter cross-section view of a second sleeve part, and
Figure 4 is a one quarter section view of the valve plunger.

In a preferred form of the invention, the distributing valve has a body 10 provided with an inlet port 11 leading to a valve chamber 12 and with a plurality of radially spaced outlet ports 13 communicating with the chamber.

A 2-part sleeve is press fitted within the valve chamber 12 and comprises a first part 14 and a second part 15. The first part 14 is mounted at the inlet side of the chamber 12 and has a squared uninterrupted annular end surface 16 facing away, or downstream, from the inlet port 11. The squared end 16, being flat, can be ground smooth and square to a very high degree of accuracy.

The second part 15 of the sleeve has an end surface 17 which is also easily accessible for grinding to a very high degree of smoothness and squareness. The end 17 is provided with a plurality of radially spaced slots 18. Since these slots intersect, or open into, the end surface 17, they are readily accessible for grinding or broaching to width. Moreover, the corners 19 can be kept square and sharp to a very high degree of accuracy, more so than the corners 20 and the bottom surface 21 of the slots.

In its assembled position, the sleeve 15 is press fitted within the valve chamber 12 with the end surface 17 between the slots 18 in sealing engagement with the squared end 16 of the first sleeve 14.

The two sleeve parts are bored as at 22 and 23 and these bores are preferably finish ground or honed after the sleeve parts have been press fitted into the valve body so as to insure accurate alignment and identical sizing.

A valve plunger 25 is slidably mounted within the sleeve bores and it includes a cylindrical land 26 which is a close sealing fit within the sleeve bores and is adapted to overlap the slots 18 for closing the same. The valve plunger 25 is normally urged to a closed position by a spring 27 and the inward movement of the valve plunger is limited by a stop shoulder 28 which engages the outer end of the sleeve part 15. The valve chamber 12 is closed by a cap 29 which also serves as an abutment for the outer end of the spring 27.

The inner end 30 of the valve plunger is ground square and smooth and when the plunger is retracted the end 30 will pass by the end surface 16 of the first sleeve part simultaneously at all points about the periphery of the sleeve end. Since the end 17 of the second sleeve part is in tight sealing engagement with the end 16 of the first sleeve part, the slots 18 will all open simultaneously within a high degree of accuracy as the plunger surface 30 passes the end surface 16. Furthermore, the retraction of the plunger 25 to any given position wherein the end surface 30 partially uncovers the slots 18 results in the slots 18 being open in equal amounts to a high degree of accuracy so that the same amount of fluid will pass into each outlet port.

Normally, the jet engine fuel is not finely filtered and fuel passing through the valve may have foreign particles therein which could cause the valve plunger 25 to stick if the particles got between the plunger and the sleeve parts 14 and 15. To preclude this, finely filtered fluid is introduced laterally into the sliding fit between the plunger and sleeve. Seepage fluid from the fit is then distributed to the valve outlets in substantially equal amounts.

In the form of the invention shown, a fine filter 31 is mounted in the inlet port and there is a chamber 32 surrounding the filter. Some of the fluid from the inlet port passes through the filter and chamber 32 through passageways 33 and 34 to a flat spot 35 on the second sleeve 15 and through a hole 36 into an internal annular groove 37 in the second sleeve. From the latter, the filtered fluid seeps into the sliding fits between the valve plunger and the second sleeve 15 on both sides of the groove 37. The filtered fluid passing through the fit toward the outer end of the plunger 25 collects in the space 38 and passes through a channel 39 in the outer sleeve part 15 to one of the discharge ports 13. Meanwhile, the filtered fluid passing between the inner guide portion of the valve plunger and the bore 23 of the second sleeve 15 collects in an annular groove 40 in the sleeve 15 and then passes through the annular clearance between the valve plunger land 26 and discharges into all of the radial ports 13 through the slots 18 in substantially equal amounts.

The outer guide portion of the plunger is provided with a series of annular ribs 41 to afford a greater resistance to flow of the filtered fluid to the outer end of the valve plunger than is afforded the flow to the inner end of the valve plunger, thereby causing the greater part of the filtered fuel flow to pass to the inner end of the valve plunger to be discharged in substantially equal amounts to all of the outlet ports. In this manner the total delivery of filtered and unfiltered fluid to the outlet ports is maintained equal for each port. Because of the annular ribs 41 the amount of fluid which discharged from the channel 39 into the one outlet port 13 is so small that at very low flows, the flow through this particular outlet port is only about three percent greater than through the other ports. At intermediate and higher flows, the difference is imperceptible.

In the embodiment of the invention illustrated in the drawings, there is a means for mechanically retracting the valve plunger 25 to open the outlet ports. This means comprises a hydraulically operated rod 50 which is attached to a piston head 51. The latter is slidably mounted in a liner 52 which is inserted in a counterbore 53 of the valve body and retained by a cap 54. A lateral wall 54 of the liner 52 and the interior of the piston head 51 define a chamber in which a spring 55 is housed. The upper end of the piston head 51 has a conical seat portion 56 adapted to engage a seat 57 in the cap 54. The spring 55 normally keeps the rod 50 in a retracted position out of contact with the valve plunger 25 and with the seats 56 and 57 in contact. A bleed port 58 through the transverse wall 54 connects the spring chamber 59 to the interior of the valve housing 10.

In the normal operation of the distributing valve, fluid under pressure from a supply line enters the port 11 and acts upon the end 30 of the valve plunger 25. When the pressure is sufficient to overcome the spring 27, the valve plunger retracts to simultaneously uncover the slots 18 to afford equal flow of fluid to each of the outlet ports 13.

When it is desired to supply fuel to the engine before the supply pressure has been built up enough to retract the valve plunger 25, the hydraulically operated rod 50 is utilized. Port 60 is connected to a source of fluid under pressure and the supply of such fluid to the port 60 is controlled by the operator through a valve or other suitable means not shown in the drawing.

When the pressure fluid is admitted to the port 60, it acts upon the piston head 51 against the action of the spring 55 to lower the rod 50 for unseating the valve plunger 25. Upon release of the fluid pressure within the port 60, the spring 55 retracts the rod 50 to permit normal operation of the valve plunger 25.

From the above, it is apparent that a distributing valve has been provided which is relatively easy to manufacture and yet is capable of very close control over the relative amounts of fluid delivered to each of a plurality of outlet ports, and that an effective system has been provided for equally distributing to the outlet ports finely filtered leakage fluid which has been directed to the sliding valve fit for keeping the same free of contaminating particles which might otherwise lodge therein and cause sticking of the valve plunger.

It is apparent that the number of outlet ports 13, the shaping of the slots 18, as well as other changes in the parts, may be made without departing from the invention as covered by the following claims.

I claim:

1. In a valve for distributing fluid to a multiple of delivery points, a valve casing having a bore and an inlet port leading thereto, a plurality of outlet ports communicating with said bore at radially spaced points, a valve plunger slidable within the bore and having a cylindrical land to overlap the outlet ports for opening and closing the same, the valve plunger also having a guide portion within said bore and closely fitted thereto, means for introducing finely filtered fluid between said guide portion and said bore at a point intermediate the ends of said guide portion, means associated with said guide portion offering greater resistance to flow of filtered fluid between said intermediate point and the outer end of said guide portion than between said intermediate point and the inner end of said guide portion whereby a substantially greater part of the filtered fluid will pass through the fit between the inner guide portion and the bore than between the outer guide portion and bore, means for discharging the filtered fluid passing between the inner guide portion and bore into the outlet ports in substantially equal amounts, and means for discharging the filtered fluid passing between the outer guide portion and the bore to at least one of the outlet ports.

2. A valve in accordance with claim 1 in which said means for offering greater resistance to flow of filtered fluid between the intermediate point and said outer guide portion comprises a series of annular ribs on said outer portion.

3. A valve in accordance with claim 1 in which the bore is formed in a sleeve secured in the valve casing and the means for discharging the filtered fluid passing between the outer guide portion and the bore to one of the outlet ports is a channel between the sleeve and the casing.

4. In a valve for distributing fluid to a multiple of delivery ports, a valve casing having a bore and an inlet port leading thereto, a plurality of outlet ports communicating with said bore at radially spaced points, a valve plunger slidable within the bore and having a cylindrical land to overlap the outlet ports for opening and closing the same, the valve plunger also having a guide portion within said bore and closely fitted thereto, means for introducing finely filtered fluid in the annular space between said guide portion and said bore at a point intermediate the ends of said guide portion, and means for discharging the filtered fluid passing between the guide portion and the bore into the outlet ports in substantially equal quantities, said means for discharging filtered fluid including an annular groove in communication with said annular space and interconnecting said outlet ports when said land is closing said outlet ports.

References Cited in the file of this patent

UNITED STATES PATENTS

| 1,164,600 | Forster | Dec. 14, 1915 |
| 2,536,896 | Wood | Jan. 2, 1951 |
| 2,664,910 | Boyd et al. | Jan. 5, 1954 |
| 2,705,829 | Mock | Apr. 12, 1955 |
| 2,734,523 | Wiggans | Feb. 14, 1956 |
| 2,796,081 | Dannevig et al. | June 18, 1957 |
| 2,826,216 | Thomas | Mar. 11, 1958 |